United States Patent
Tsuchiya et al.

(10) Patent No.: US 9,329,088 B2
(45) Date of Patent: May 3, 2016

(54) THERMOELECTRIC CONVERSION ELEMENT, LIGHT DETECTION DEVICE, ELECTRONIC APPARATUS

(71) Applicant: SEIKO EPSON CORPORATION, Tokyo (JP)

(72) Inventors: Yasushi Tsuchiya, Fujimi-machi (JP); Takayuki Yonemura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/662,899

(22) Filed: Mar. 19, 2015

(65) Prior Publication Data
US 2015/0276493 A1    Oct. 1, 2015

(30) Foreign Application Priority Data
Apr. 1, 2014    (JP) .................................. 2014-075183

(51) Int. Cl.
*G01J 5/34*    (2006.01)
*G01J 5/12*    (2006.01)

(52) U.S. Cl.
CPC .... *G01J 5/34* (2013.01); *G01J 5/12* (2013.01); *G01J 2005/123* (2013.01); *G01J 2005/345* (2013.01)

(58) Field of Classification Search
CPC ... G01J 5/046; G01J 5/0853; G02F 1/133528; H01L 41/1873
See application file for complete search history.

(56) References Cited

U.S. PATENT DOCUMENTS

| 6,198,119 B1 | 3/2001 | Nabatame et al. |
| 2007/0108385 A1 | 5/2007 | Mantese et al. |
| 2008/0295879 A1* | 12/2008 | Atanackovic ........... H01L 35/22 136/238 |
| 2010/0071179 A1* | 3/2010 | Koizumi et al. ............ 29/25.35 |
| 2011/0102517 A1 | 5/2011 | Yonemura et al. |
| 2011/0102518 A1 | 5/2011 | Yonemura et al. |
| 2011/0180711 A1 | 7/2011 | Tsuchiya |
| 2013/0136937 A1* | 5/2013 | Fujii et al. ..................... 428/500 |
| 2014/0284480 A1 | 9/2014 | Yonemura et al. |

FOREIGN PATENT DOCUMENTS

| JP | 08-017245 A | 1/1996 |
| JP | 09-245525 A | 9/1997 |
| JP | 2006-518836 A | 8/2006 |
| JP | 2011-093295 A | 5/2011 |
| JP | 2011-097002 A | 5/2011 |
| JP | 2011-153851 A | 8/2011 |
| JP | 2014-185982 A | 10/2014 |

* cited by examiner

*Primary Examiner* — David Porta
*Assistant Examiner* — Faye Boosalis
(74) *Attorney, Agent, or Firm* — Global IP Counselors, LLP

(57) ABSTRACT

A thermoelectric conversion element includes a pair of electrodes and a pyroelectric material, which is a ferroelectric layer, sandwiched between the pair of electrodes. The pyroelectric material includes at least Bi (bismuth), La (lanthanum), and Fe (iron). The molar fraction of La in a Bi/La site in the crystal structure of the pyroelectric material is 0.15 or more and 0.20 or less. Such a thermoelectric conversion element, and a light detection device and electronic apparatus which include the thermoelectric conversion element have a good pyroelectric function without including Pb (lead).

10 Claims, 18 Drawing Sheets

| | MOLAR FRACTION OF La IN A SITE | DEGREE OF POLARIZATION (2Pr) [μC/cm²] | POLARIZATION RETENTION RATE AFTER 7min | POLARIZATION RETENTION RATE AFTER 15 h |
|---|---|---|---|---|
| COMPARATIVE EXAMPLE 1 | 0.10 | 56.8 | 43% | 34% |
| COMPARATIVE EXAMPLE 2 | 0.21 | 95.2 | 62% | 35% |
| COMPARATIVE EXAMPLE 3 | 0.22 | 98.7 | 18% | -3% |
| EXAMPLE 1 | 0.15 | 103.8 | 87% | 84% |
| EXAMPLE 2 | 0.18 | 99.5 | 89% | 87% |
| EXAMPLE 3 | 0.20 | 105.5 | 91% | 88% |

FIG. 8

THERMOELECTRIC CONVERSION ELEMENT, LIGHT DETECTION DEVICE, ELECTRONIC APPARATUS

BACKGROUND

1. Technical Field

The present invention relates to thermoelectric conversion elements, pyroelectric light detection devices, and electronic apparatuses.

2. Related Art

Among the known light detection devices is a thermal light detection device including thermal photodetectors arranged in a two-dimensional array along two orthogonal axial directions, each thermal photodetector including, on a substrate, a thermal light detection element having a light absorptive film, and a support member supporting the thermal light detection element (JP-A-2011-153851).

The thermal light detection element of JP-A-2011-153851 above includes a capacitor in which a ferroelectric film, which is a pyroelectric material capable of converting thermal energy into electric energy, is sandwiched between a first electrode and a second electrode. JP-A-2011-153851 above describes, as an example of the ferroelectric film, a film of lead zirconate titanate (PZT, $Pb(Zi,Ti)O_3$), which can be formed by sol-gel, sputtering, MOCVD, or the like. Although PZT is a good pyroelectric material, PZT is considered to be environmentally unfriendly because it contains Pb (lead).

JP-T-2006-518836 describes a pyroelectric sensor system including a scene element having a ferroelectric layer which does not contain Pb (lead). JP-T-2006-518836 states that the ferroelectric layer is selected from strontium bismuth tantalate (SBT), barium bismuth tantalate, and lanthanum bismuth tantalate.

JP-T-2006-518836 above describes SBT as an example material included in the ferroelectric layer. SBT has a lower polarization retention rate than that of PZT. Therefore, when the scene element including an SBT-based ferroelectric material is applied to a pyroelectric sensor system, it is desirable to extract thermal energy received by the scene element as electric energy while maintaining polarization by applying a voltage to the scene element. Therefore, the application of a voltage to the scene element during reading of the pyroelectric sensor system is likely to increase noise, which makes it difficult to allow the pyroelectric sensor system to have high sensitivity.

SUMMARY

An advantage of some aspects of the invention is to solve at least a portion of the above problems by providing the following embodiments or example applications.

Application Example

A thermoelectric conversion element according to an aspect of the invention includes a pair of electrodes and a ferroelectric layer sandwiched between the pair of electrodes. The ferroelectric layer includes at least Bi (bismuth), La (lanthanum), and Fe (iron). The molar fraction of La in a Bi/La site in the crystal structure of the ferroelectric layer is 0.15 or more and 0.20 or less.

According to this aspect, a thermoelectric conversion element which has good polarization characteristics without including Pb (lead) can be provided.

It is preferable that, in the thermoelectric conversion element described in the above application example, the ferroelectric layer further include Mn (manganese) and Ti (titanium), and the molar fraction of Ti in a Fe/Mn/Ti site in the crystal structure of the ferroelectric layer be 0.05 or less.

With this configuration, even if the thickness of the ferroelectric layer is reduced to, for example, less than 1 μm, the occurrence of leakage current between the pair of electrodes can be suppressed.

It is preferable that the thermoelectric conversion element according to this aspect have a degree of polarization retained in the thermoelectric conversion element changes reversibly with respect to a change in element temperature.

With this configuration, a thermoelectric conversion element which can maintain good polarization characteristics even when the element temperature changes, can be provided.

It is preferable that the thermoelectric conversion element according to this aspect have a pyroelectric coefficient of less than $-4$ $[nC/(cm^2 \cdot K)]$ during the time when element temperature increases.

With this configuration, a thermoelectric conversion element which is sensitive, i.e., has high sensitivity, to a change in temperature, can be provided.

It is preferable that the thermoelectric conversion element according to this aspect have a polarization retention rate of 87% or more in 7 min after a polarization process.

With this configuration, even when a polarization process is performed 7 min after another polarization process is performed once, the polarization retention rate does not decrease excessively. Therefore, the thermoelectric conversion element can efficiently convert received thermal energy into electric energy. In other words, a thermoelectric conversion element which provides a highly precise output can be provided.

It is preferable that the thermoelectric conversion element according to this aspect have a polarization retention rate of 84% or more in 15 h after a polarization process.

With this configuration, even when a polarization process is performed 15 h after another polarization process is performed once, the polarization retention rate does not decrease excessively. Therefore, it is not necessary to perform a polarization process in order to obtain a highly precise output each time an electrical signal is extracted. In other words, a power-saving thermoelectric conversion element can be provided.

It is preferable that the thermoelectric conversion element according to this aspect further include a light absorptive portion which is in contact with one of the pair of electrodes.

With this configuration, light entering the thermoelectric conversion element can be absorbed by the light absorptive portion and efficiently converted into thermal energy. In other words, a thermoelectric conversion element having high sensitivity can be provided.

Application Example

A light detection device according to another aspect of the invention includes the above thermoelectric conversion elements arranged in a two-dimensional array along two orthogonal axial directions.

According to this aspect, a light detection device which can output, as an image, a distribution of light (temperature) entering a region in which the thermoelectric conversion elements are arranged in a two-dimensional array, can be provided. The thermoelectric conversion element has good polarization characteristics, and therefore, it is not necessary to apply a voltage for polarization to the thermoelectric conversion element each time the image is read out. Therefore, a power-saving light detection device can be provided.

Application Example

An electronic apparatus according to another aspect of the invention includes the above thermoelectric conversion element.

According to this aspect, for example, an electronic apparatus, such as an apparatus for analyzing (measuring) physical information of an object, or the like, can be provided.

Application Example

An electronic apparatus according to another aspect of the invention includes the above light detection device.

According to this aspect, for example, an electronic apparatus which includes a pyroelectric light detection device, such as a security apparatus for detecting fire or heat generation, a factory automation (FA) used in a factory, or the like, can be provided.

BRIEF DESCRIPTION OF THE DRAWINGS

The invention will be described with reference to the accompanying drawings, wherein like numbers reference like elements.

FIG. 8 is a table showing configurations and polarization characteristics of pyroelectric materials of examples and comparative examples.

DESCRIPTION OF EXEMPLARY EMBODIMENTS

Specific embodiments of the invention will now be described with reference to the accompanying drawings. Note that the figures used are enlarged or reduced when necessary in order to improve the legibility of a portion to be described.

First Embodiment

Light Detection Device

Figure 1:
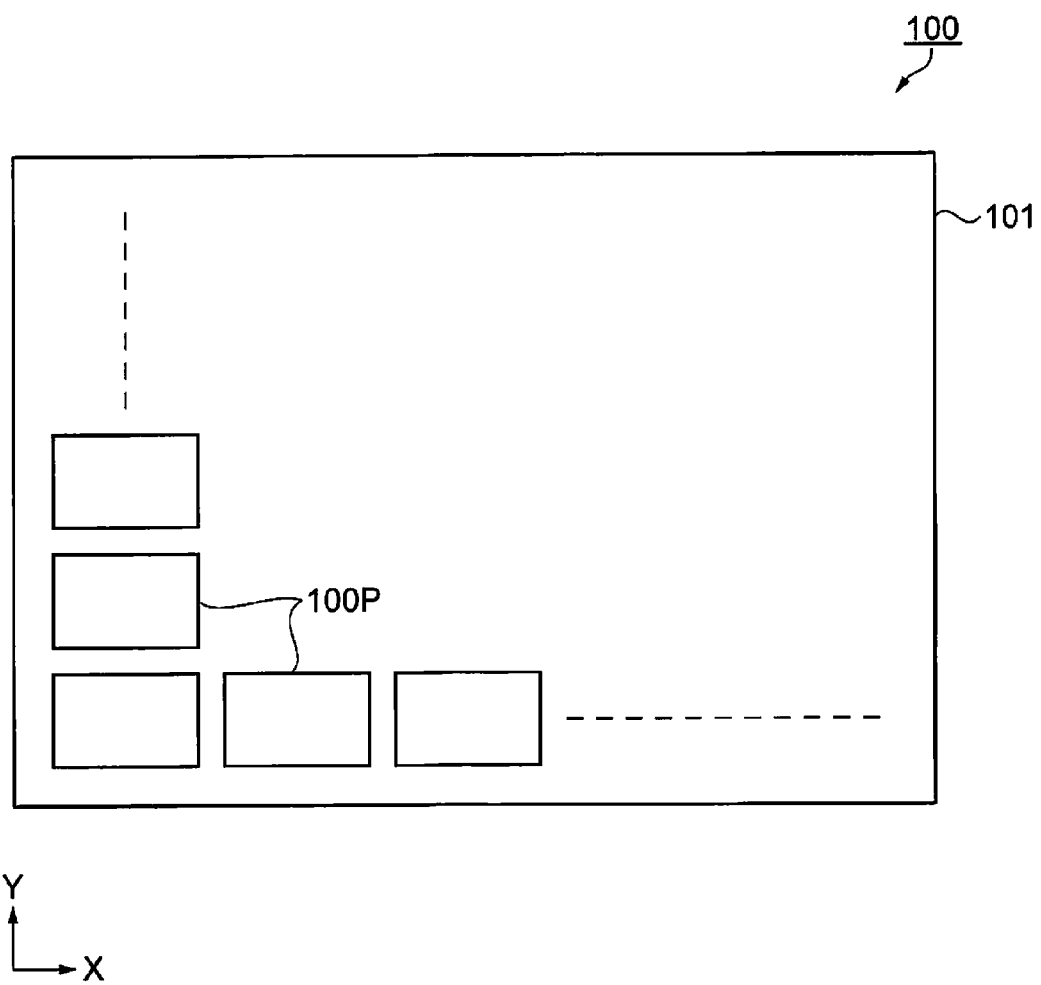
FIG. 1 is a schematic plan view showing a configuration of a light detection device.
Figure 2:
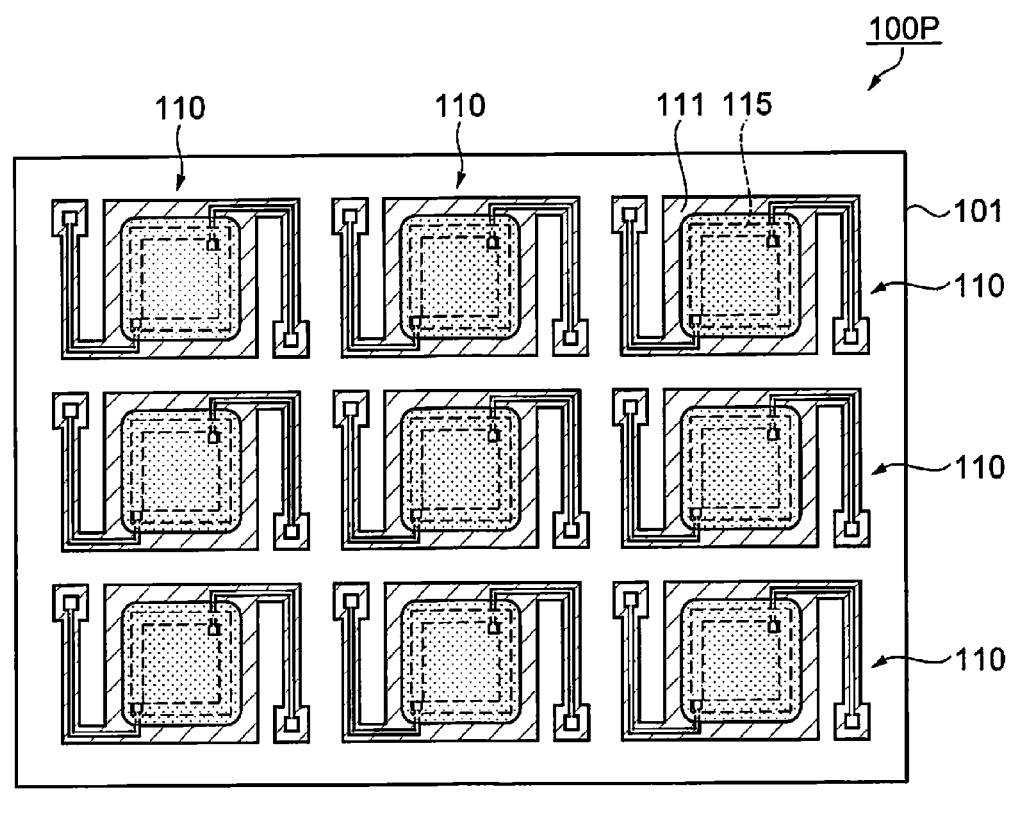
FIG. 2 is a schematic plan view showing a configuration of pixels of a light detection device.
Figure 3:
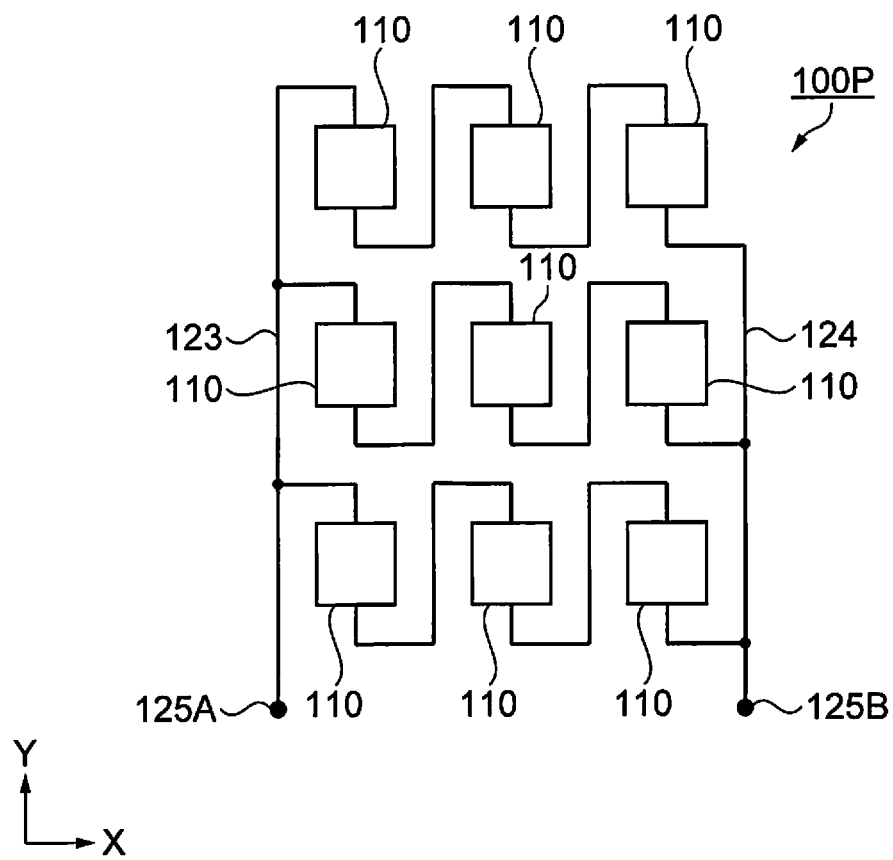
FIG. 3 is a circuit diagram showing an electrical configuration of a pixel of a light detection device.

Firstly, a light detection device including a thermoelectric conversion element according to this embodiment will be described with reference to FIGS. 1-3. FIG. 1 is a schematic plan view showing a configuration of the light detection device. FIG. 2 is a schematic plan view showing a configuration of pixels of the light detection device. FIG. 3 is a circuit diagram showing an electrical configuration of a pixel of the light detection device.

As shown in FIG. 1, the light detection device 100 of this embodiment includes a substrate 101 and a plurality of pixels 100P formed on the substrate 101.

The substrate 101 is a semiconductor substrate of, for example, silicon or the like. The pixels 100P are arranged on the substrate 101 in a two-dimensional array (in a matrix) along a first direction (row direction) and a second direction (column direction) intersecting the first direction. In the description that follows, the first direction is referred to as "the X direction," and the second direction is referred to as "the Y direction." To view in a direction perpendicular to the drawing sheet is referred to as "to view from above."

The light detection device 100 of this embodiment is, for example, applied to a terahertz camera described below. The pixel 100P has a function of converting incident light into an electrical signal.

Specifically, as shown in FIG. 2, the pixel 100P includes three thermoelectric conversion elements 110 in each of the X and Y directions, i.e., a total of nine thermoelectric conversion elements 110. In other words, the light detection device 100 is an array of the thermoelectric conversion elements 110. The light detection device 100 is, for example, in the shape of a quadrangle with sides of about 1-10 mm as viewed from above. The pixel 100P is, for example, in the shape of a quadrangle with sides of about 100-300 µm in order to selectively and efficiently receive terahertz light having a frequency of 1-3 THz, taking the wavelength of terahertz light into consideration. The thermoelectric conversion element 110 provided in the pixel 100P has a pyroelectric capacitor 115 which is formed on a support member 111 which is, for example, similarly in the shape of a quadrangle with sides of about 1-50 µm as viewed from above. The configuration and structure of the thermoelectric conversion element 110 will be described in detail below. The thermoelectric conversion element 110 is an element which converts incident light into heat, and further converts the heat into an electrical signal for outputting.

As shown in FIG. 3, in the pixel 100P, the three thermoelectric conversion elements 110 arranged in the X direction are connected together in series, and the sets of three thermoelectric conversion elements 110, that are arranged in the Y direction, are connected together in parallel between an interconnect line 123 and an interconnect line 124. An output terminal 125A is provided at an end of the interconnect line 123, and an output terminal 125B is provided at an end of the interconnect line 124.

Therefore, the light detection device 100 includes a plurality of thermoelectric conversion elements 110 for each pixel 100P, and therefore, efficiently receives incident light, and outputs the detected light as an electrical signal through the output terminals 125A and 125B for each pixel 100P. Note that the shapes and sizes of the light detection device 100, the pixel 100P, and the thermoelectric conversion element 110 are not limited to those described above. The number and arrangement of the thermoelectric conversion elements 110 in the pixel 100P are not limited to those described above.

Thermoelectric Conversion Element

Figure 4:
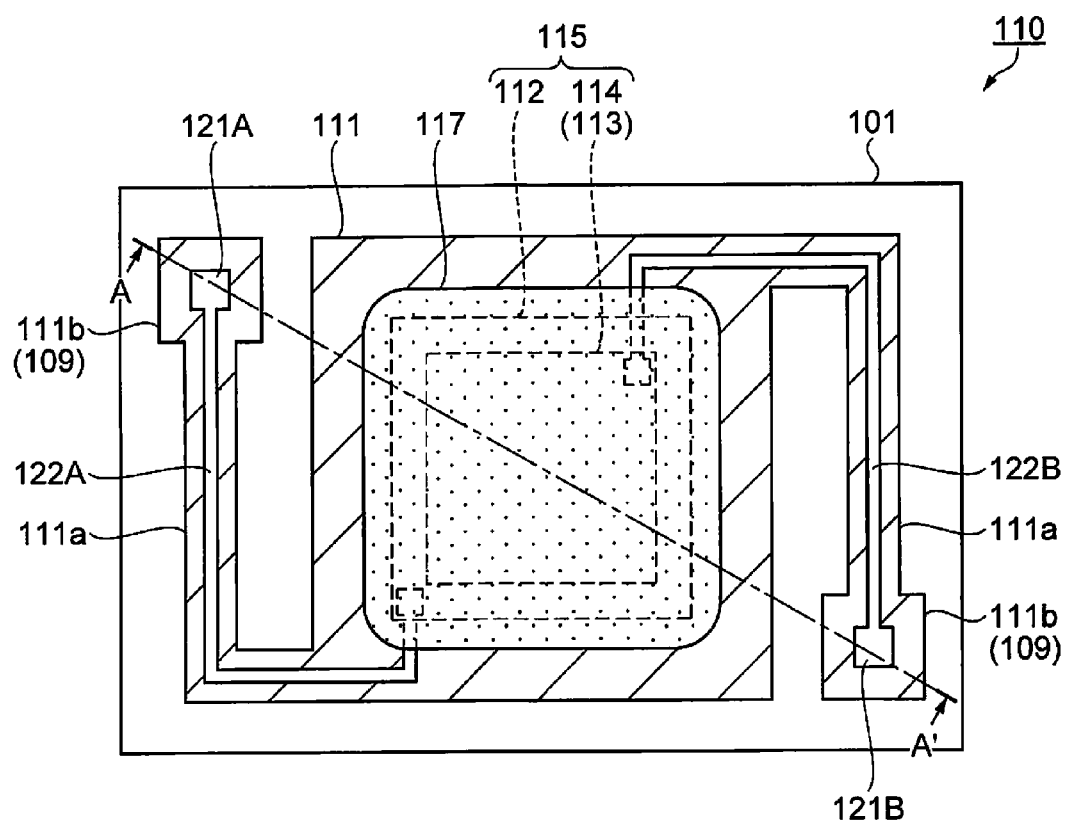
FIG. 4 is a schematic plan view showing a configuration of a thermoelectric conversion element.
Figure 5A:
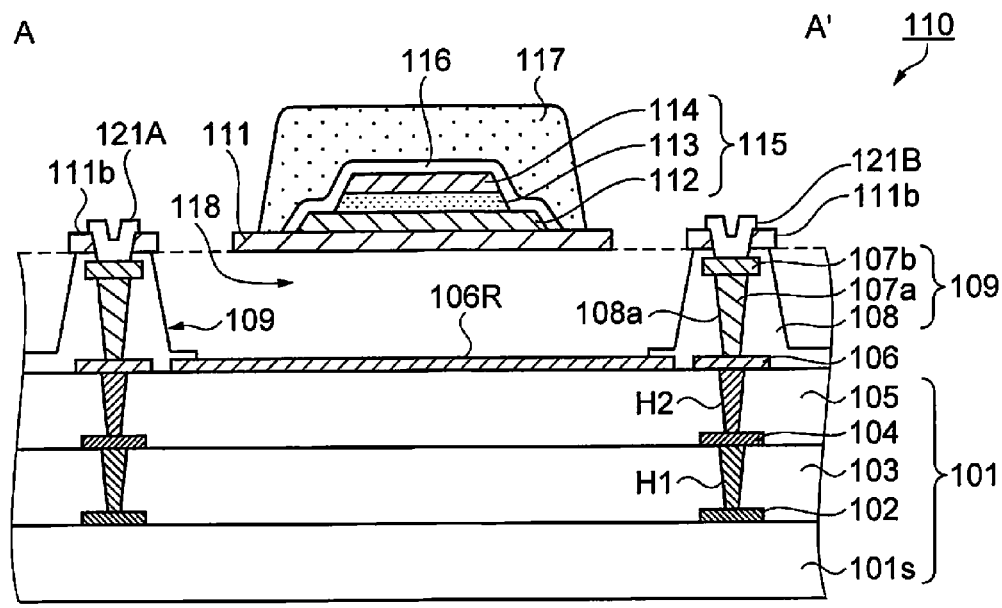
FIG. 5A is a schematic cross-sectional view showing a structure of the thermoelectric conversion element, taken along line A-A' of FIG. 4.
Figure 5B:
FIG. 5B is a schematic cross-sectional view showing an example configuration of a pyroelectric capacitor.
Figure 6A:
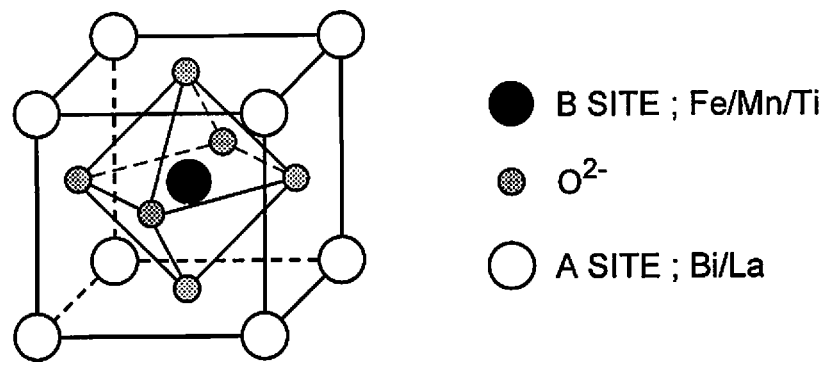
FIG. 6A is a schematic diagram showing a crystal structure of a pyroelectric material.
Figure 6B:
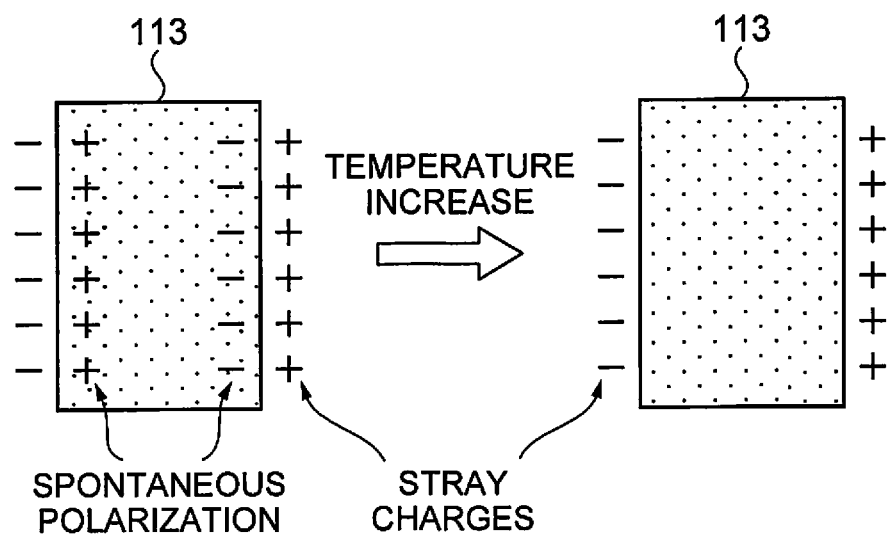
FIG. 6B is a diagram for describing the pyroelectric function of a pyroelectric material.
Figure 7A:
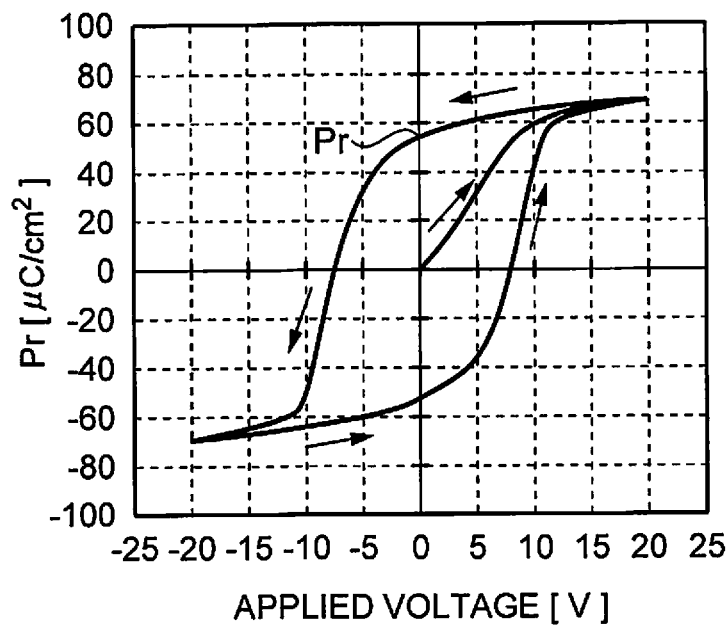
FIG. 7A is a graph showing polarization characteristics of a pyroelectric material.
Figure 7B:
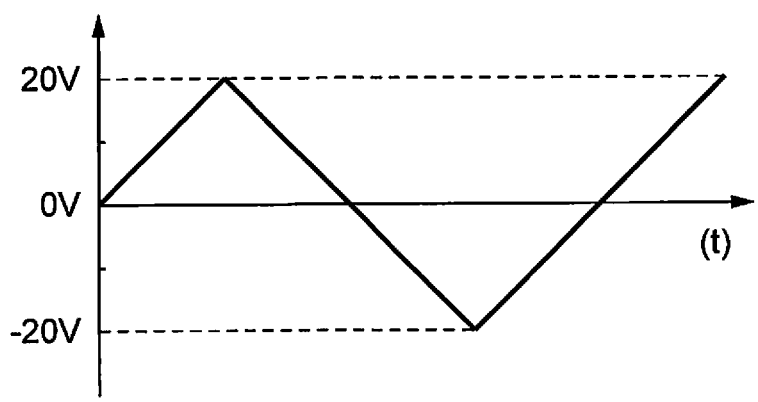
FIG. 7B is a diagram showing a technique of performing a polarization process on a pyroelectric material.

Next, the thermoelectric conversion element 110 of this embodiment will be described with reference to FIGS. 4-7B. FIG. 4 is a schematic plan view showing a configuration of the thermoelectric conversion element 110. FIG. 5A is a schematic cross-sectional view showing a structure of the thermoelectric conversion element 100, taken along line A-A' of FIG. 4. FIG. 5B is a schematic cross-sectional view showing an example configuration of a pyroelectric capacitor. FIG. 6A is a schematic diagram showing a crystal structure of a pyroelectric material. FIG. 6B is a diagram for describing the pyroelectric function of a pyroelectric material. FIG. 7A is a graph showing polarization characteristics of a pyroelectric material. FIG. 7B is a diagram showing a technique of performing a polarization process on a pyroelectric material.

As shown in FIG. 4, the thermoelectric conversion element 110 has a substrate 101, a support member 111 provided on the substrate 101, and a pyroelectric capacitor 115 provided on the support member 111. The pyroelectric capacitor 115 has a pair of electrodes 112 and 114 which are provided on the support member 111, facing each other, and a pyroelectric material 113 sandwiched between the pair of electrodes 112 and 114.

The pyroelectric capacitor 115 which is in the shape of a quadrangle smaller than or completely contained inside the support member 111 as viewed from above, is provided substantially at the center of the support member 111 which is similarly in the shape of a quadrangle as viewed from above. The pyroelectric capacitor 115 on the support member 111 is also covered by a light absorptive portion 117. A detailed configuration of the pyroelectric capacitor 115 will be described below.

An arm portion 111a is provided, extending from each of diagonally opposite corner portions of the support member 111. The arm portion 111a extends in parallel with and along a side of the support member 111 forming the corner portion. A tip portion 111b which is in the shape of a quadrangle as viewed from above is provided at a tip of the arm portion 111a. The tip portion 111b is provided on a post 109 formed on the substrate 101.

An interconnect line 122A which is connected to the electrode 112 of the pair of electrodes 112 and 114 is provided on one of the arm portions 111a which is located to the left of the support member 111 in FIG. 4. The interconnect line 122A has a connection portion 121A at a location where the interconnect line 122A overlaps the tip portion 111b.

An interconnect line 122B connected to the electrode 114 is provided on the other arm portion 111a which is located to the right of the support member 111 in FIG. 4. The interconnect line 122B has a connection portion 121B at a location where the interconnect line 122B overlaps the tip portion 111b. In other words, the pair of connection portions 121A and 121B connected to the pyroelectric capacitor 115 are provided on the tip portions 111b which are located at diagonally opposite portions of the substrate 101 and are separated from the support member 111.

As shown in FIG. 5A, for example, a plurality of (three) interconnect layers 102, 104, and 106 are provided on a base 101s of the substrate 101. A first interlayer insulating film 103 is provided between the interconnect layers 102 and 104. A second interlayer insulating film 105 is provided between the interconnect layers 104 and 106.

In the interconnect layer 106, which is the uppermost layer, provided are interconnect lines corresponding to the two connection portions 121A and 121B, which are electrically connected to the pyroelectric capacitor 115. The tip portions 111b at which the connection portions 121A and 121B are provided are each supported by the post 109 surrounded by a cavity 118.

The post 109 has a structure in which a conductive portion 107a, and an interconnect layer 107b which is in contact with the conductive portion 107a, are buried in a pillar-like insulating portion 108 which is surrounded by the cavity 118. The conductive portion 107a is formed by filling a via hole 108a formed in the insulating portion 108 with a conductive material.

The connection portions 121A and 121B each penetrate through the tip portion 111b to be in contact with the interconnect layer 107b of the post 109. In other words, the connection portions 121A and 121B are each electrically connected to the underlying interconnect layer 106 through the conductive post 109. Moreover, the interconnect layer 106 is electrically connected to either the underlying interconnect layer 104 or the underlying interconnect layer 102 through a via hole H2 provided in the second interlayer insulating film 105 or a via hole H1 provided in the first interlayer insulating film 103. In the interconnect layers 102 and 104, formed are the interconnect lines 123 and 124 (see FIG. 3), respectively, which electrically connect the thermoelectric conversion elements 110 provided on the substrate 101 together. Note that the number of interconnect layers on the base 101s is not limited to this.

The support member 111 and the arm portion 111a are separated from the substrate 101 with the cavity 118 being provided therebetween, and are supported by the post 109 surrounded by the cavity 118.

The support member 111 on which the pyroelectric capacitor 115 is provided is, for example, formed from silicon oxide and has a thickness of about 500 nm. Because the thickness of the support member 111 is considerably small compared to the thickness of the substrate 101, the support member 111 is also called a "membrane (thin film)."

A reflection layer 106R is formed on the second interlayer insulating film 105 facing the support member 111 with the cavity 118 being provided between the second interlayer insulating film 105 and the support member 111. In other words, the reflection layer 106R is formed as a portion of the interconnect layer 106 on the second interlayer insulating film 105.

The pyroelectric capacitor 115 has the pair of electrodes 112 and 114, and a pyroelectric material 113 which is a ferroelectric layer sandwiched between the pair of electrodes 112 and 114. Of the pair of electrodes 112 and 114, one which is located closer to the support member 111 is referred to as the "lower electrode 112," and the other which faces the lower electrode 112 with the pyroelectric material 113 being interposed therebetween is referred to as the "upper electrode 114."

The pyroelectric material 113 sandwiched between the lower electrode 112 and the upper electrode 114 is formed from a ferroelectric material which is a metal oxide containing Bi (bismuth), La (lanthanum), Fe (iron), Mn (manganese), and Ti (titanium). As shown in FIG. 6A, such a BLF-based metal oxide has a crystal structure which has an A site including Bi and La at vertices of the cubic crystal lattice, and a B site including Fe, Mn, and Ti inside the crystal lattice. Also, oxygen ions ($O^{2-}$) exist inside the crystal lattice, surrounding the B site. This crystal structure is called the "perovskite structure." In the crystal lattice, if an oxygen ion ($O^{2-}$) is displaced in any direction, the electric charge distribution is biased to one side.

As shown in FIG. 6B, if the crystal plane of the metal oxide having the electric charge distribution that is biased to one side has a uniform alignment direction to some extent to be in the spontaneous polarization state, stray charges are attracted to the surface of the pyroelectric material 113, resulting in an electrically neutral state. In the pyroelectric material 113 in the neutral state, for example, if the temperature increases, the spontaneous polarization state is eliminated, leaving only the stray charges, which are then discharged through the electrode which is in contact with the pyroelectric material 113. A similar discharge of electric charges also occurs when the temperature of the pyroelectric material 113 decreases and therefore the spontaneous polarization state is eliminated. After the discharge of electric charges, if the temperature of the pyroelectric material 113 is kept unchanged, the pyroelectric material 113 is brought again into the spontaneous polarization state, resulting in an electrically neutral state. This is the pyroelectric function of converting heat into electric charge in the pyroelectric capacitor 115. As described above, the spontaneous polarization of the pyroelectric material 113 is caused by the alignment capability of the crystal plane of the metal oxide included in the pyroelectric material 113. The pyroelectric material 113 of this embodiment is caused to have good polarization characteristics by setting the molar fraction of La in the A site to 0.15 or more and 0.20 or less.

Note that, in the pyroelectric material 113 of this embodiment, the molar fraction of Fe in the B site is 0.96, the molar fraction of Mn in the B site is 0.01, and the molar fraction of Ti in the B site is 0.03. In view of the alignment capability of the crystal plane of the metal oxide, the molar fractions of Mn and Ti are preferably 0.01 or more and 0.05 or less. In particular, it has been found that if the molar fraction of Ti in the B site is greater than 0.05, leakage current is likely to increase in the pyroelectric capacitor 115. Therefore, the molar fraction of Ti is set to be 0.05 or less.

The lower electrode 112 and the upper electrode 114 in contact with the pyroelectric material 113 are formed from platinum (Pt), whose crystal orientation is easy to control during formation of the electrode film. The lower electrode 112 has a thickness of about 150 nm. The upper electrode 114 has a thickness of about 50 nm.

The pyroelectric material 113, which is made contact with the lower electrode 112 of platinum (Pt) having a uniform crystal growth orientation, can, for example, be formed using a gas-phase film formation technique such as CVD, sputtering, or the like, or a liquid-phase film formation technique such as sol-gel or the like. As a result, the alignment capability of the crystal plane of the BLF-based metal oxide which is the pyroelectric material 113 can be improved. The pyroelectric material 113 preferably has a thickness of no less than 0.2 µm (200 nm) and less than 1.0 µm (1000 nm). If the thickness of the pyroelectric material 113 is 1.0 µm or more, the heat capacity increases, which is likely to influence the sensitivity. Also, if the thickness is less than 0.2 µm in view of the heat capacity, it is not likely to obtain a ferroelectric layer (the pyroelectric material 113) which has stable alignment capability of the crystal plane during film formation. In this embodiment, the thickness of the pyroelectric material 113 is set to be about 0.4 µm.

The pyroelectric material 113 is formed from the BLF-based metal oxide. Therefore, if the pyroelectric material 113 is reduced, the pyroelectric function is likely to be lost. Even when the pyroelectric material 113 is sandwiched between the lower electrode 112 and the upper electrode 114 which are formed from platinum (Pt), the reduction reaction may proceed through the lower electrode 112 and the upper electrode 114. Even in the structure in which the pyroelectric material 113 is sandwiched between the lower electrode 112 and the upper electrode 114, a side surface of the pyroelectric material 113 is exposed and therefore is likely to be reduced. Therefore, in this embodiment, as shown in FIG. 5B, an anti-reduction film 116 is provided to cover a surface of the pyroelectric capacitor 115 provided on the support member 111. The anti-reduction film 116 may, for example, be formed from aluminum oxide ($AlO_x$). In addition, an anti-reduction film 116a formed from aluminum oxide ($AlO_x$) is provided between the lower electrode 112 and the support member 111.

As described above, the pyroelectric capacitor 115 provided on the support member 111 is covered by the light absorptive portion 117 as well as the anti-reduction film 116 (see FIG. 5A). The light absorptive portion 117 is, for example, formed by depositing silicon oxide or silicon nitride. The light absorptive portion 117 has a thickness of about 1 µl. Because the light absorptive portion 117 covers an uneven surface of the support member 111, the "thickness" here refers to an average thickness of a region covered by the light absorptive portion 117.

Light entering the thermoelectric conversion element 110 is absorbed by the light absorptive portion 117 and is then conducted as heat to the pyroelectric capacitor 115. The pyroelectric capacitor 115 discharges the heat as electric charge, i.e., converts the heat into an electrical signal, by the pyroelectric function. The thermoelectric conversion element 110 of this embodiment discharges electric charge from the pyroelectric capacitor 115 as the temperature of the thermoelectric conversion element 110 increases from a predetermined temperature. When the increased temperature returns to the original temperature, electric charge is accumulated in the pyroelectric capacitor 115. If the thermoelectric conversion element 110 is kept at a predetermined temperature or at an increased temperature state, the thermoelectric conversion element 110 does not discharge electric charge.

In the thermoelectric conversion element 110 thus configured, the structure in which the reflection layer 106R is provided below the support member 111 on which the pyroelectric capacitor 115 is provided, with the cavity 118 being provided between the reflection layer 106R and the support member 111, not only allows the light absorptive portion 117 to absorb incident light, but also allows the reflection layer 106R to reflect light toward the support member 111. Also, the cavity 118 is provided between the support member 111 and the substrate 101, and therefore, heat conducted from the light absorptive portion 117 to the pyroelectric capacitor 115 can be suppressed from being dissipated to the substrate 101 through the support member 111. In other words, the thermoelectric conversion element 110 can efficiently convert incident light into heat and then into an electrical signal, and output the electrical signal.

The reflection layer 106R of this embodiment which reflects light or heat is, for example, a layer of Ti or Au (gold) having a thickness of about 100 nm. Note that, in the thermoelectric conversion element 110, the reflection layer 106R is not essential.

The thermoelectric conversion element 110 may be produced using the following known technique. Initially, a trench (recess portion) including the post 109 is formed on the interconnect layer 106. Next, the trench is filled to form a sacrifice layer of, for example, silicon oxide. A surface of the sacrifice layer is planarized by, for example, chemical-mechanical polishing (CMP). Thereafter, a precursor layer for the support member 111 is formed to cover a surface of the planarized sacrifice layer. The precursor layer is formed by depositing silicon oxide or silicon nitride using, for example, CVD. Thereafter, the anti-reduction film 116a (see FIG. 5B) covering the precursor layer is formed, and the lower electrode 112 of platinum (Pt) is then formed on the anti-reduction film 116a. The BLF-based metal oxide (ferroelectric layer) having a thickness of 0.4 μm is formed to cover the lower electrode 112 using, for example, sol-gel. Moreover, an electrode layer of platinum (Pt) is formed. The electrode layer is patterned to form the upper electrode 114, and the ferroelectric layer is patterned using the upper electrode 114 thus formed as a mask to form the pyroelectric material 113. The anti-reduction film 116 is formed to cover a surface of the pyroelectric capacitor 115 thus formed. Next, the interconnect line 122A connected to the lower electrode 112 is formed on the anti-reduction film 116, and the connection portion 121A connected to the interconnect line 122A is formed. Similarly, the interconnect line 122B connected to the upper electrode 114 is formed on the anti-reduction film 116, and the connection portion 121B connected to the interconnect line 122B is formed. Thereafter, the light absorptive portion 117 which covers the pyroelectric capacitor 115 as viewed from above is formed. Thereafter, the precursor layer of the support member 111 is patterned to form the support member 111, the arm portion 111a extending from the support member 111, and the tip portion 111b. A portion through which the sacrifice layer is exposed by the patterning of the precursor layer is used as an opening to remove the sacrifice layer from the opening by etching, thereby forming the cavity 118 between the reflection layer 106R and the support member 111. As a distance between the reflection layer 106R and the support member 111, i.e., a depth of the cavity 118, increases, it is preferably more difficult to conduct heat. Because, as described above, the cavity 118 is formed by etching the sacrifice layer, the depth of the cavity 118 is preferably within the range of 1-5 μm. In this embodiment, the cavity 118 has a depth of 2.5 μm.

In the step of etching the layer of silicon oxide or silicon nitride to form the light absorptive portion 117 and the step of etching the sacrifice layer of silicon oxide, dry etching is performed using, for example, a fluorine-based treatment gas having reducing capability. Even if such dry etching is performed, the pyroelectric material 113 which is a ferroelectric material of the metal oxide is not reduced by the dry etching treatment gas because the surface of the pyroelectric capacitor 115 is covered by the anti-reduction films 116 and 116a.

Next, polarization characteristics and a polarization process of the pyroelectric capacitor 115 will be described with reference to FIGS. 7A and 7B. As described above, the thermoelectric conversion element 110 can convert incident light into heat, and then convert the heat into electric charge. Such a pyroelectric function is provided by the spontaneous polarization of the pyroelectric material 113 which is a ferroelectric layer used in the pyroelectric capacitor 115 as described above. The polarization characteristics of the pyroelectric capacitor 115 may be determined by measuring electric charge which occurs when a predetermined voltage for causing polarization is applied between the lower electrode 112 and the upper electrode 114.

In this embodiment, as shown in FIG. 7B, an alternating current voltage (triangular wave) whose potential varies with time in a linear fashion between 20 V and −20 V, where 0 V is the reference, is applied between the lower electrode 112 and the upper electrode 114 of the pyroelectric capacitor 115 so that the pyroelectric material 113 is polarized. In this embodiment, such a way to cause polarization is referred to as a "polarization process." The frequency of the alternating current voltage is 1 kHz. In other words, the time for which one cycle of the alternating current voltage is applied is 1 millisecond (msec). When the potential is increased back to 20 V by applying one cycle of the alternating current voltage, a hysteresis graph indicating the polarization characteristics of the pyroelectric capacitor 115 is obtained as shown in FIG. 7A. As shown in FIG. 7A, as the applied voltage is increased from 0 V to 20 V, the polarization becomes more significant, and is positively (+) saturated at 20 V. As the applied voltage is decreased from 20 V to −20 V, the polarity of the polarization is reversed, and is negatively (−) saturated at −20 V. As the applied voltage is increased from −20 V back to 20 V, the direction of the polarization is reversed, and is positively (+) saturated again. In the polarization process, at least one cycle of the alternating current voltage may be applied, or alternatively, the alternating current voltage may be repeatedly applied.

In the pyroelectric capacitor 115 of this embodiment, almost the same degree of polarization is obtained for the opposite polarization directions, i.e., the positive (+) and negative (−) directions. In other words, it can be understood that the BLF-based metal oxide included in the pyroelectric material 113 has good ferroelectric properties exhibiting the stable degree of polarization which does not vary depending on the polarization direction.

Next, specific advantages of the configuration of the BLF-based metal oxide which is a ferroelectric material for use in the pyroelectric material 113 will be described using examples and comparative examples with reference to FIGS. 8-15B. In order to compare polarization characteristics of the examples and comparative examples, it is assumed that, in this embodiment, the sum of the absolute values of the value (Pr) of positive (+) remanent polarization and the value (−Pr) of negative remanent polarization, in hysteresis obtained by the polarization process, where the applied voltage is 0 V, i.e., electric field is not applied to the pyroelectric material 113, is used as the degree of polarization (2Pr).

FIG. 8 is a table showing the configurations and polarization characteristics of the pyroelectric materials of the examples and comparative examples. More specifically, shown are the molar fraction of La in the A site of the pyroelectric material using the BLF-based metal oxide, the degree of polarization (2Pr) in the polarization process, the polarization retention rate in 7 min after the polarization process, and the polarization retention rate in 15 h after the polarization process, in the examples and comparative examples.

Figure 9A:
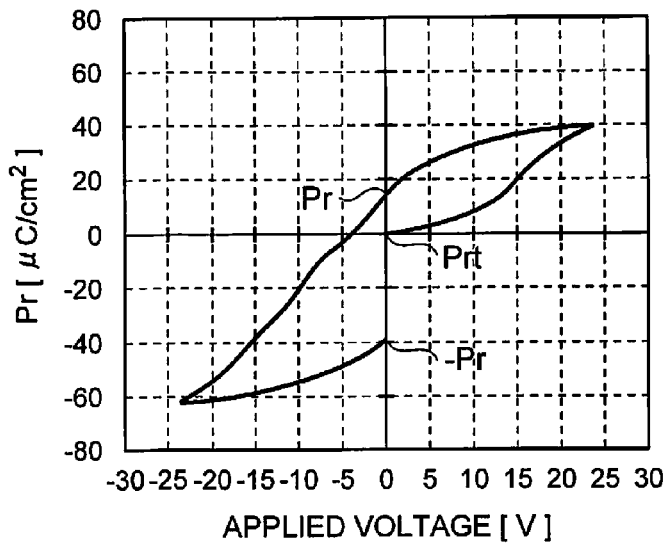
FIG. 9A is a graph showing hysteresis in 7 min after a polarization process in Comparative Example 1.
Figure 9B:
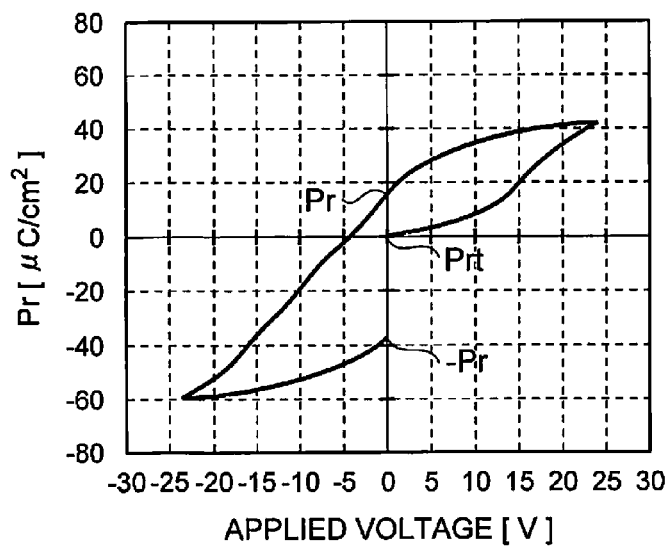
FIG. 9B is a graph showing hysteresis in 15 h after a polarization process in Comparative Example 1.
Figure 9C:
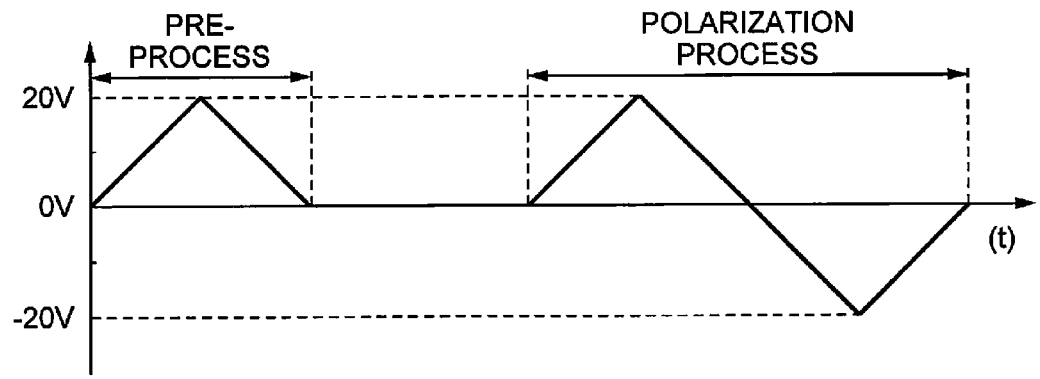
FIG. 9C is a diagram showing a polarization process technique.

FIG. 9A is a graph showing hysteresis in 7 min after the polarization process in Comparative Example 1. FIG. 9B is a graph showing hysteresis in 15 h after the polarization process in Comparative Example 1. FIG. 9C is a diagram showing the polarization process technique.

Figure 10A:
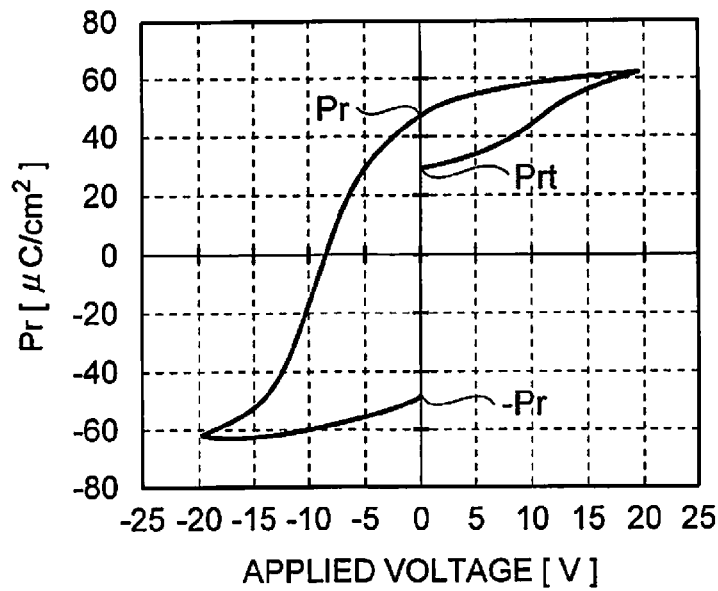
FIG. 10A is a graph showing hysteresis in 7 min after a polarization process in Comparative Example 2.
Figure 10B:
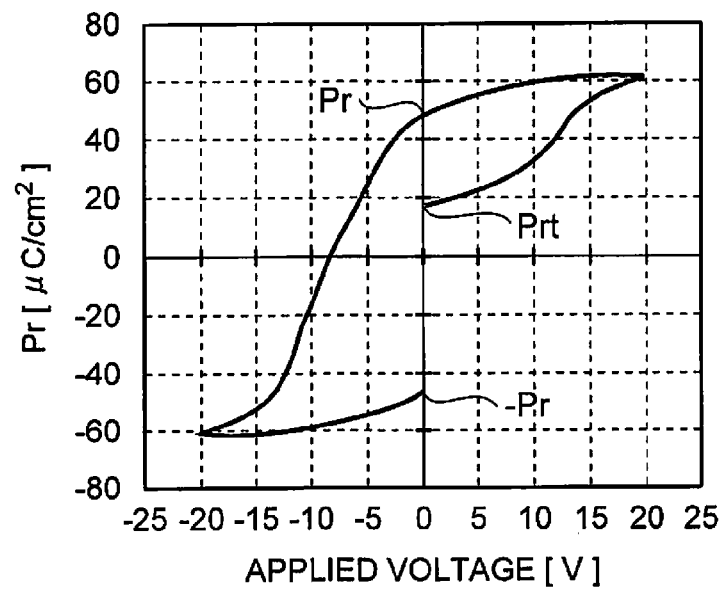
FIG. 10B is a graph showing hysteresis in 15 h after a polarization process in Comparative Example 2.

FIG. 10A is a graph showing hysteresis in 7 min after the polarization process in Comparative Example 2. FIG. 10B is a graph showing hysteresis in 15 h after the polarization process in Comparative Example 2.

Figure 11A:
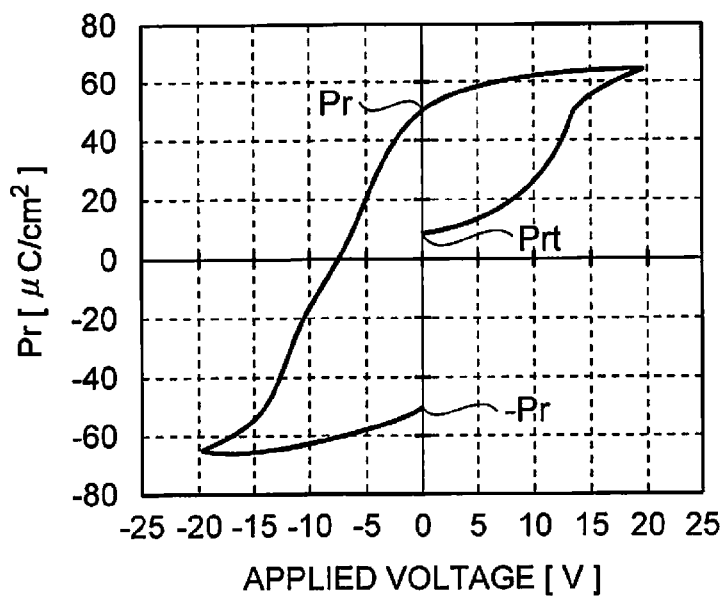
FIG. 11A is a graph showing hysteresis in 7 min after a polarization process in Comparative Example 3.
Figure 11B:
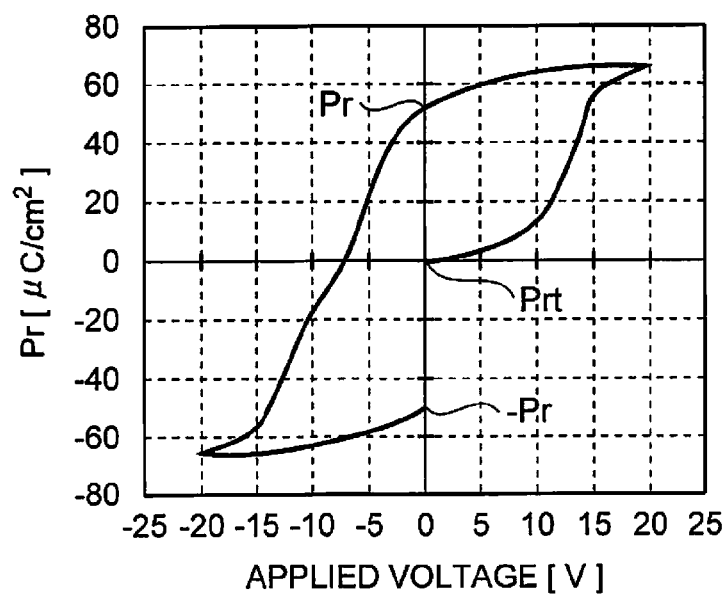
FIG. 11B is a graph showing hysteresis in 15 h after a polarization process in Comparative Example 3.

FIG. 11A is a graph showing hysteresis in 7 min after the polarization process in Comparative Example 3. FIG. 11B is a graph showing hysteresis in 15 h after the polarization process in Comparative Example 3.

Figure 12A:
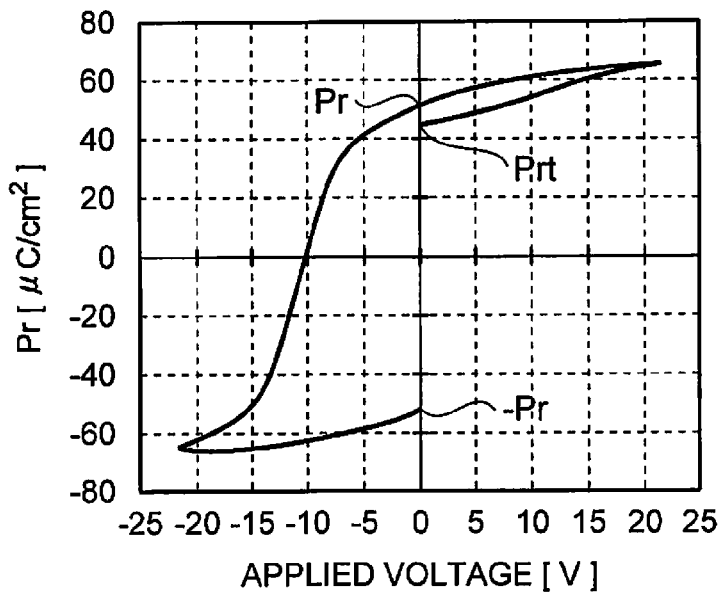
FIG. 12A is a graph showing hysteresis in 7 min after a polarization process in Example 1.
Figure 12B:
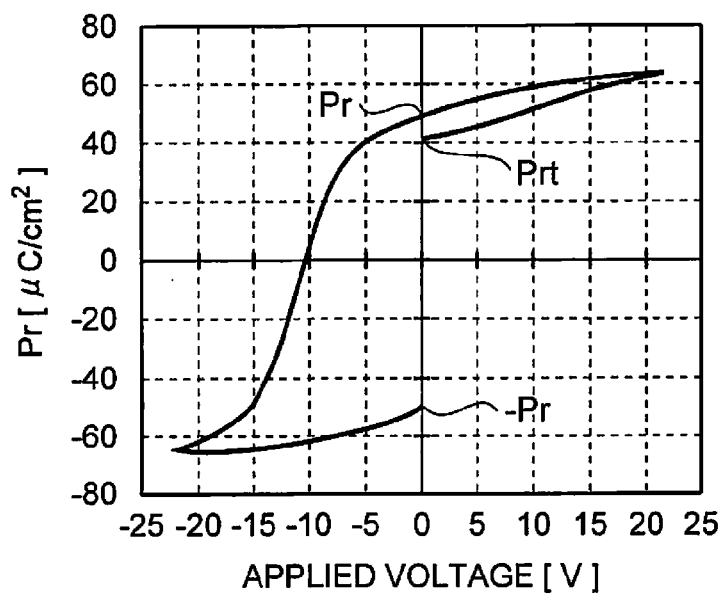
FIG. 12B is a graph showing hysteresis in 15 h after a polarization process in Example 1.

FIG. 12A is a graph showing hysteresis in 7 min after the polarization process in Example 1. FIG. 12B is a graph showing hysteresis in 15 h after the polarization process in Example 1.

Figure 13A:
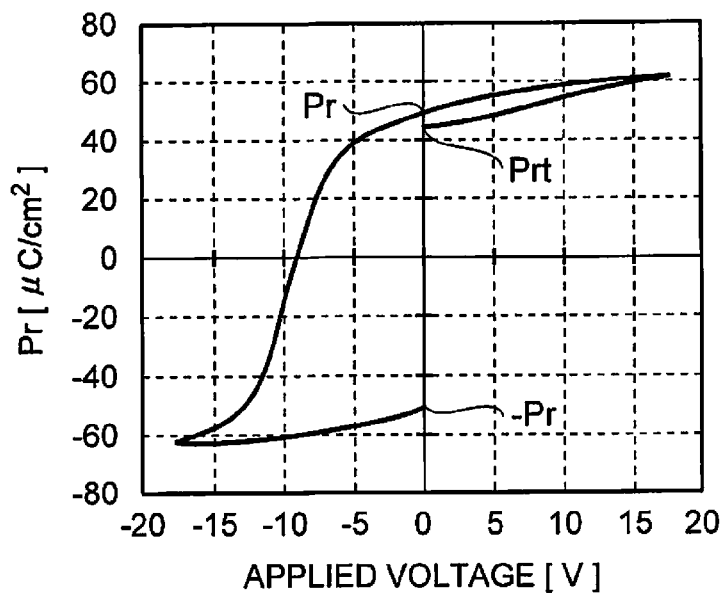
FIG. 13A is a graph showing hysteresis in 7 min after a polarization process in Example 2.
Figure 13B:
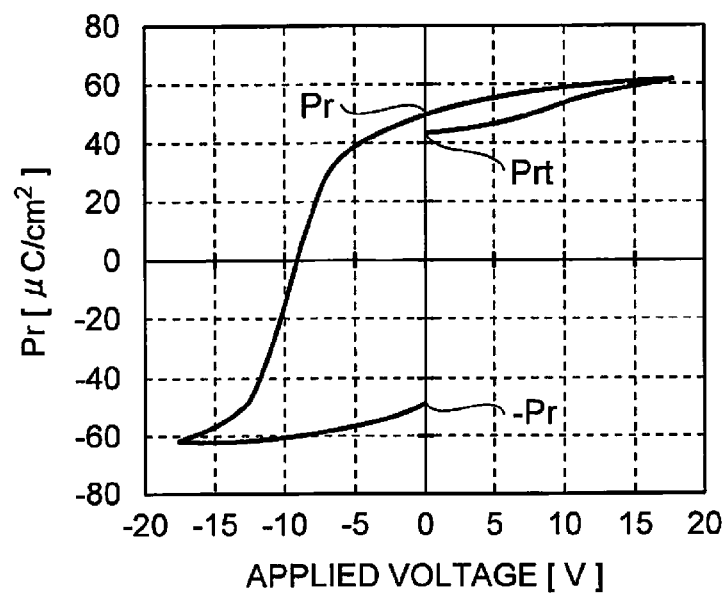
FIG. 13B is a graph showing hysteresis in 15 h after a polarization process in Example 2.

FIG. 13A is a graph showing hysteresis in 7 min after the polarization process in Example 2. FIG. 13B is a graph showing hysteresis in 15 h after the polarization process in Example 2.

Figure 14A:
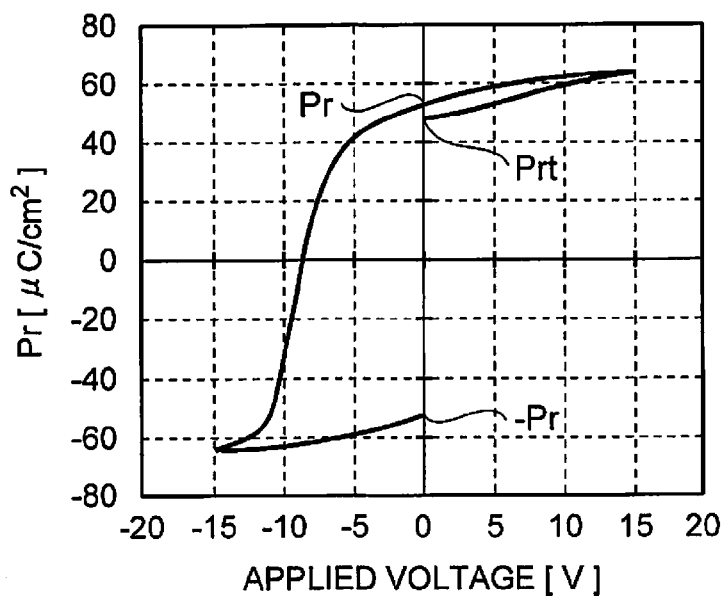
FIG. 14A is a graph showing hysteresis in 7 min after a polarization process in Example 3.
Figure 14B:
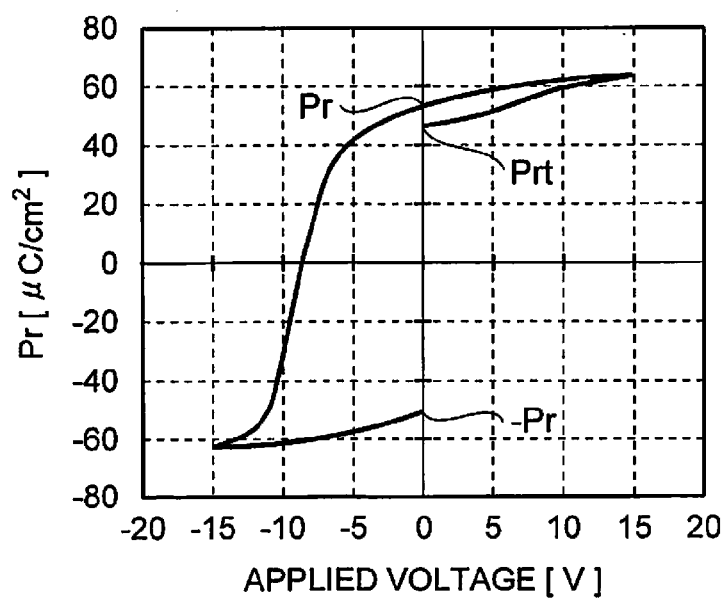
FIG. 14B is a graph showing hysteresis in 15 h after a polarization process in Example 3.

FIG. 14A is a graph showing hysteresis in 7 min after the polarization process in Example 3. FIG. 14B is a graph showing hysteresis in 15 h after the polarization process in Example 3.

Figure 15A:
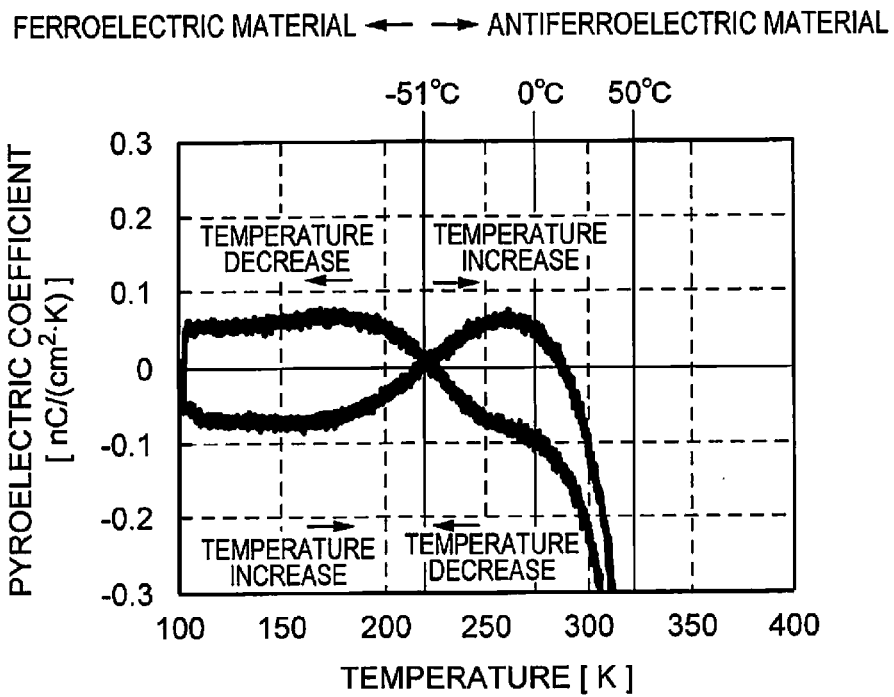
FIG. 15A is a graph showing a relationship between element temperature and a pyroelectric coefficient of Comparative Example 3.
Figure 15B:
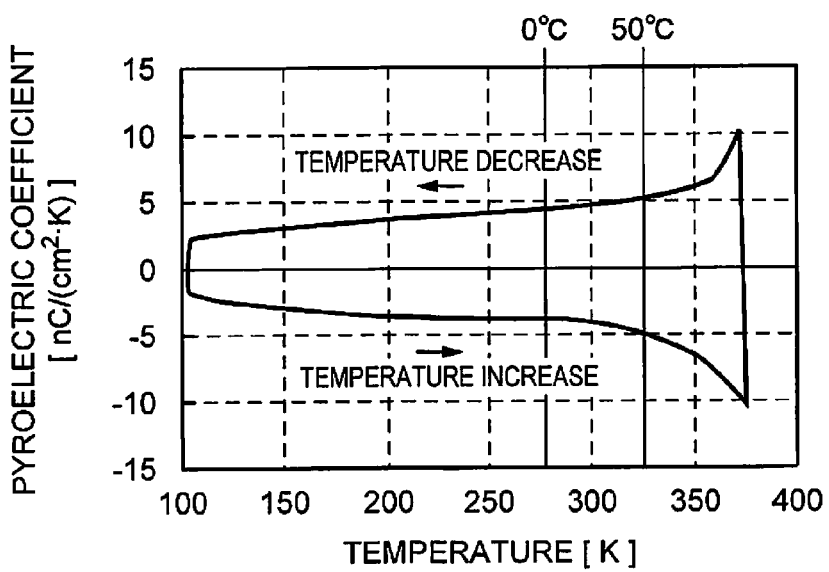
FIG. 15B is a graph showing a relationship between element temperature and a pyroelectric coefficient of Example 3.

FIG. 15A is a graph showing a relationship between the element temperature and pyroelectric coefficient of Comparative Example 3. FIG. 15B is a graph showing a relationship between the element temperature and pyroelectric coefficient of Example 3.

Comparative Example 1

The pyroelectric material 113 of Comparative Example 1 includes a BLF-based metal oxide with a crystal structure in which the molar fraction of La in the A site (Bi, La) is 0.10. The molar fractions of Fe, Mn, and Ti in the B site are 0.96, 0.01, and 0.03, respectively, as described above. The pyroelectric material 113 has a thickness of 0.4 µm, and the pyroelectric capacitor 115 is in the shape of a square with sides of 30 µm as viewed from above, as described above.

Comparative Example 2

The pyroelectric material 113 of Comparative Example 2 includes a BLF-based metal oxide with a crystal structure in which the molar fraction of La in the A site is 0.21. The other configuration is the same as that of Comparative Example 1.

Comparative Example 3

The pyroelectric material 113 of Comparative Example 3 includes a BLF-based metal oxide with a crystal structure in which the molar fraction of La in the A site is 0.22. The other configuration is the same as that of Comparative Example 1.

Example 1

The pyroelectric material 113 of Example 1 includes a BLF-based metal oxide with a crystal structure in which the molar fraction of La in the A site is 0.15. The other configuration is the same as that of Comparative Example 1.

Example 2

The pyroelectric material 113 of Example 2 includes a BLF-based metal oxide with a crystal structure in which the molar fraction of La in the A site is 0.18. The other configuration is the same as that of Comparative Example 1.

Example 3

The pyroelectric material 113 of Example 3 includes a BLF-based metal oxide with a crystal structure in which the molar fraction of La in the A site is 0.20. The other configuration is the same as that of Comparative Example 1.

In order to compare the polarization characteristics of the examples and comparative examples, the degree of polarization (2Pr) and the polarization retention rate H in the polarization process were obtained. Specifically, as shown in FIG. 9C, a pre-process (first polarization process) of applying a voltage which varies from 0 V to 20 V or from 20 V to 0 V in a linear fashion to the thermoelectric conversion element, was performed. Thereafter, a polarization process (second polarization process) of applying one cycle of alternating current voltage (triangular wave) which varies between 20 V and −20 V in a linear fashion, where 0 V is the reference, was performed a predetermined time after the pre-process. Here, the predetermined time was 7 min and 15 h.

When the polarization process was performed on the thermoelectric conversion element of Comparative Example 1, 7 min after the pre-process, hysteresis shown in FIG. 9A was obtained. As shown in FIG. 9A, although the pyroelectric material of Comparative Example 1 was polarized by the pre-process, the positive remanent polarization value decreased while the pyroelectric material was left to stand for 7 min. In the subsequent polarization process, the value of the degree of polarization (2Pr) was 56.8 [µC/cm$^2$]. In this embodiment, the value of positive remanent polarization after the pyroelectric material has been left to stand for a predetermined time since the pre-process, is represented by Prt. The polarization retention rate H of the pyroelectric material of this embodiment is given by the following equation (1) and represented in percentage.

$$H = [(2Pr)/2 - (Pr - Prt)]/((2Pr)/2) \quad (1)$$

Specifically, the polarization retention rate H is represented by a value which is obtained by dividing a value obtained by subtracting the value (Pr−Prt) which is a reduction of remanent polarization which occurs when the pyroelectric material is left to stand for a predetermined time from the value of remanent polarization (2Pr/2) immediately after the polarization process, by the value of remanent polarization immediately after the polarization process.

According to the hysteresis graph of FIG. 9A, the value of Pr of Comparative Example 1 is 16.2 [µC/cm$^2$], and the value of Prt after 7 min is 0.08 [µC/cm$^2$]. Therefore, according to Expression (1), the polarization retention rate H in the polarization process after 7 min of Comparative Example 1 is about 43%.

Similarly, when the polarization process was performed on the thermoelectric conversion element of Comparative Example 1, 15 h after the pre-process, hysteresis shown in FIG. 9B was obtained. According to the hysteresis graph of FIG. 9B, the value of the degree of polarization (2Pr) of Comparative Example 1 is 56.3 [μC/cm$^2$], the value of Pr is 18.6 [μC/cm$^2$], the value of Prt after 15 h is 0.08 [μC/cm$^2$]. Therefore, according to Equation (1), the polarization retention rate H in the polarization process after 15 h of Comparative Example 1 is about 34% (see FIG. 8).

When the polarization process was performed on the thermoelectric conversion element of Comparative Example 2, 7 min after the pre-process, hysteresis shown in FIG. 10A was obtained. When the polarization process was performed on the thermoelectric conversion element of Comparative Example 2, 15 h after the pre-process, hysteresis shown in FIG. 10B was obtained. Based on these results, the degree of polarization (2Pr) and the polarization retention rate H are calculated in a manner similar to that of Comparative Example 1. The thermoelectric conversion element of Comparative Example 2 has a degree of polarization (2Pr) of 95.2 [μC/cm$^2$], a polarization retention rate H after 7 min of about 62%, and a polarization retention rate H after 15 h of about 35% (see FIG. 8).

When the polarization process was performed on the thermoelectric conversion element of Comparative Example 3, 7 min after the pre-process, hysteresis shown in FIG. 11A was obtained. When the polarization process was performed on the thermoelectric conversion element of Comparative Example 3, 15 h after the pre-process, hysteresis shown in FIG. 11B was obtained. According to these results, the thermoelectric conversion element of Comparative Example 3 has a degree of polarization (2Pr) of 98.7 [μC/cm$^2$], a polarization retention rate H after 7 min of about 18%, and a polarization retention rate H after 15 h of about −3% (see FIG. 8).

When the polarization process was performed on the thermoelectric conversion element of Example 1, 7 min after the pre-process, hysteresis shown in FIG. 12A was obtained. When the polarization process was performed on the thermoelectric conversion element of Example 1, 15 h after the pre-process, hysteresis shown in FIG. 12B was obtained. According to these results, the thermoelectric conversion element of Example 1 has a degree of polarization (2Pr) of 103.8 [μC/cm$^2$], a polarization retention rate H after 7 min of about 87%, and a polarization retention rate H after 15 h of about 84% (see FIG. 8).

When the polarization process was performed on the thermoelectric conversion element of Example 2, 7 min after the pre-process, hysteresis shown in FIG. 13A was obtained. When the polarization process was performed on the thermoelectric conversion element of Example 2, 15 h after the pre-process, hysteresis shown in FIG. 13B was obtained. According to these results, the thermoelectric conversion element of Example 2 has a degree of polarization (2Pr) of 99.5 [μC/cm$^2$], a polarization retention rate H after 7 min of about 89%, and a polarization retention rate H after 15 h of about 87% (see FIG. 8).

When the polarization process was performed on the thermoelectric conversion element of Example 3, 7 min after the pre-process, hysteresis shown in FIG. 14A was obtained. When the polarization process was performed on the thermoelectric conversion element of Example 3, 15 h after the pre-process, hysteresis shown in FIG. 14B was obtained. According to these results, the thermoelectric conversion element of Example 3 has a degree of polarization (2Pr) of 105.5 [μC/cm$^2$], a polarization retention rate H after 7 min of about 91%, and a polarization retention rate H after 15 h of about 88% (see FIG. 8).

The polarization characteristics of the comparative examples and the examples are summarized in the table of FIG. 8 based on the hysteresis graphs of FIGS. 9A-14B. As shown in the table of FIG. 8, the value of the degree of polarization (2Pr) immediately after the polarization process is almost the same when the molar fraction of La in the A site falls within the range of 0.15-0.22. If the molar fraction of La is less than 0.15, the degree of polarization (2Pr) decreases sharply. On the other hand, if the molar fraction of La is less than 0.15, the polarization retention rate H decreases as well. If the molar fraction of La exceeds 0.20, the polarization retention rate H decreases sharply. The spontaneous polarization of the pyroelectric material may be caused by the alignment capability of the crystal plane of the ferroelectric material which is a BLF-based metal oxide. It is preferable that the spontaneous polarization state be maintained stably even if the polarization process is repeatedly performed. In this regard, the molar fraction of La in the A site is preferably 0.15 or more and 0.20 or less.

Although the polarization retention rate H of the pyroelectric capacitor 115 is calculated by setting that the predetermined time between the end of the pre-process and the start of the polarization process is 7 min and 15 h, the invention is not limited to this.

When light enters the thermoelectric conversion element 110, the pyroelectric material 113 discharges electric charge by the pyroelectric function, i.e., electric discharge occurs, as described above. If the polarization retention rate H calculated by setting the predetermined time to, for example, 5-10 min is 87% or more (the molar fraction of La is 0.15 or more), this indicates that if only a little time elapses after electric discharge is performed once, then when light enters the thermoelectric conversion element 110 again, an electrical signal can be extracted with a similar level of sensitivity.

If the polarization retention rate H calculated by setting the predetermined time to, for example, 12-24 h is 84% or more (the molar fraction of La is 0.15 or more), this indicates that it is not necessary to perform the polarization process in advance in order to maintain the sensitivity each time an electrical signal is extracted to read from the thermoelectric conversion element 110.

Next, the pyroelectric coefficients of the thermoelectric conversion elements of the examples and comparative examples will be described with reference to FIGS. 15A and 15B. FIG. 15A is a graph showing the pyroelectric coefficient of the thermoelectric conversion element of Comparative Example 3. FIG. 15B is a graph showing the pyroelectric coefficient of the thermoelectric conversion element of Example 3.

The pyroelectric coefficient [nC/(cm$^2$·K)] indicates a relationship between the element temperature (absolute temperature K) and degree of polarization of a thermoelectric conversion element. The thermoelectric conversion element 110 of this embodiment which uses a ferroelectric material which is a BLF-based metal oxide as the pyroelectric material 113 discharges electric charge during the time when the temperature increases. However, as shown in FIG. 15A, in the thermoelectric conversion element of Comparative Example 3, the properties (pyroelectric function) of a ferroelectric material are exhibited at an absolute temperature of less than about 220 K, and the sign of the pyroelectric coefficient is reversed at an absolute temperature of about 220 K or more, and therefore, the properties of an antiferroelectric material which loses the pyroelectric function are exhibited. This may be because the alignment of the crystal plane indicating that the electric charge of a pyroelectric material is biased to one side undergoes phase transition to a crystal structure in which the crystal plane is aligned so that the biasing of the electric charge distribution is mutually cancelled as the element temperature changes. The pyroelectric coefficient during the time when the temperature increases within the range of less than 220 K at which the thermoelectric conversion element of Comparative Example 3 exhibits the pyroelectric function is about −0.08 [nC/(cm$^2$·K)].

In contrast to this, in the thermoelectric conversion element 110 of Example 3, the degree of polarization retained in the thermoelectric conversion element 110 changes reversibly with respect to a change in the element temperature (during the time when the temperature increases and during the time when the temperature decreases) as shown in FIG. 15B, and therefore, the pyroelectric function is stable. In other words, unlike Comparative Example 3 of FIG. 15A, the pyroelectric material does not undergo phase transition to an antiferroelectric material due to a change in the element temperature. Also, as shown in FIG. 15B, the pyroelectric function is exhibited within the absolute temperature range of, for example, 223-323 K (0° C.±50° C.), which is a practical temperature range, and the pyroelectric coefficient at the time when the temperature increases is about −4 [(nC/(cm$^2$·K)], which is smaller than that of Comparative Example 3.

A relationship between the polarization characteristics (pyroelectric function) of such a thermoelectric conversion element and the crystal structure of the pyroelectric material may be influenced by the molar fraction of La in the A site (Bi/La site) of the crystal lattice. Specifically, if the molar fraction of La is less than 0.15 or no less than 0.21, the alignment directions of the crystal planes, which indicate that the electric charge is biased to one side, may not be uniform, or some crystal plane has a reversed alignment direction, depending on the temperature, and therefore, the pyroelectric function may become unstable.

According to the polarization characteristics of Examples 1-3 and Comparative Examples 1-3, it is preferable that, in the crystal lattice of the ferroelectric material which is a BLF-based metal oxide, the molar fraction of La (lanthanum) in the A site be 0.15 or more and 0.20 or less, because a sufficient degree of polarization (2Pr) and polarization retention rate H can be obtained. It is also preferable that the pyroelectric coefficient at the time when the temperature increases be less than −4 [nC/(cm$^2$·K)], because the thermoelectric conversion element 110 can have good sensitivity within a practical temperature range.

It is known that when the ferroelectric layer is formed from an SBT-based metal oxide, the degree of polarization (2Pr) is about 20 [µC/cm$^2$]. The pyroelectric coefficient, which is an index for the sensitivity of the thermoelectric conversion element 110, is proportional to the value of the degree of polarization (2Pr) at room temperature. Therefore, BLF-based metal oxides and SBT-based metal oxides have the following difference: as described above, SBT-based metal oxides have a smaller degree of polarization (2Pr), and therefore, also have a smaller pyroelectric coefficient. In other words, it can be understood that BLF-based metal oxides are a ferroelectric material which has good polarization characteristics compared to SBT-based metal oxides.

According to the above embodiments, the following advantages are obtained.

(1) The thermoelectric conversion element 110 includes the substrate 101, the support member 111 with the cavity 118 being provided between itself and the substrate 101, the pyroelectric capacitor 115 provided on the support member 111, and the light absorptive portion 117 covering the pyroelectric capacitor 115. The pyroelectric capacitor 115 has the lower electrode 112, the upper electrode 114, and the pyroelectric material 113 sandwiched between that pair of electrodes. The pyroelectric material 113 is a ferroelectric layer including a BLF-based metal oxide in which the molar fraction of La in the A site (Bi/La site) of the crystal structure is 0.15 or more and 0.20 or less, and therefore, has a higher degree of polarization (2Pr) than that of SBT-based metal oxides, and a high polarization retention rate H. Therefore, the thermoelectric conversion element 110 which stably has good polarization characteristics can be provided.

(2) In the pyroelectric material 113, the molar fractions of Mn and Ti in the B site (Fe/Mn/Ti site) of the crystal structure are 0.01 or more and 0.05 or less, and therefore, the alignment of the crystal plane of the crystal structure is stable. Also, the molar fraction of Ti is 0.05 or less, and therefore, the occurrence of leakage current in the pyroelectric capacitor 115 can be inhibited.

(3) In the thermoelectric conversion element 110, the degree of polarization retained in the thermoelectric conversion element 110 changes reversibly with respect to a change in the element temperature, and the pyroelectric coefficient at the time when the temperature increases is smaller than −4 [nC/(cm$^2$·K)], and therefore, the thermoelectric conversion element 110 which has good sensitivity within a practical temperature range can be provided.

(4) The light detection device 100 of this embodiment can output a distribution of light (temperature) entering a region in which the pixels 100P including a plurality of thermoelectric conversion elements 110 are arranged in a two-dimensional array, as an image. Also, the thermoelectric conversion element 110 has good polarization characteristics, and therefore, it is not necessary to apply a voltage for polarization to the thermoelectric conversion element 110 each time the image is read out. Therefore, an electrical signal can be read from the thermoelectric conversion element 110 in the absence of an applied voltage, and therefore, noise which occurs during reading is reduced. As a result, the light detection device 100 which has high sensitivity and saves power can be provided.

Second Embodiment

Electronic Apparatus

Figure 16:
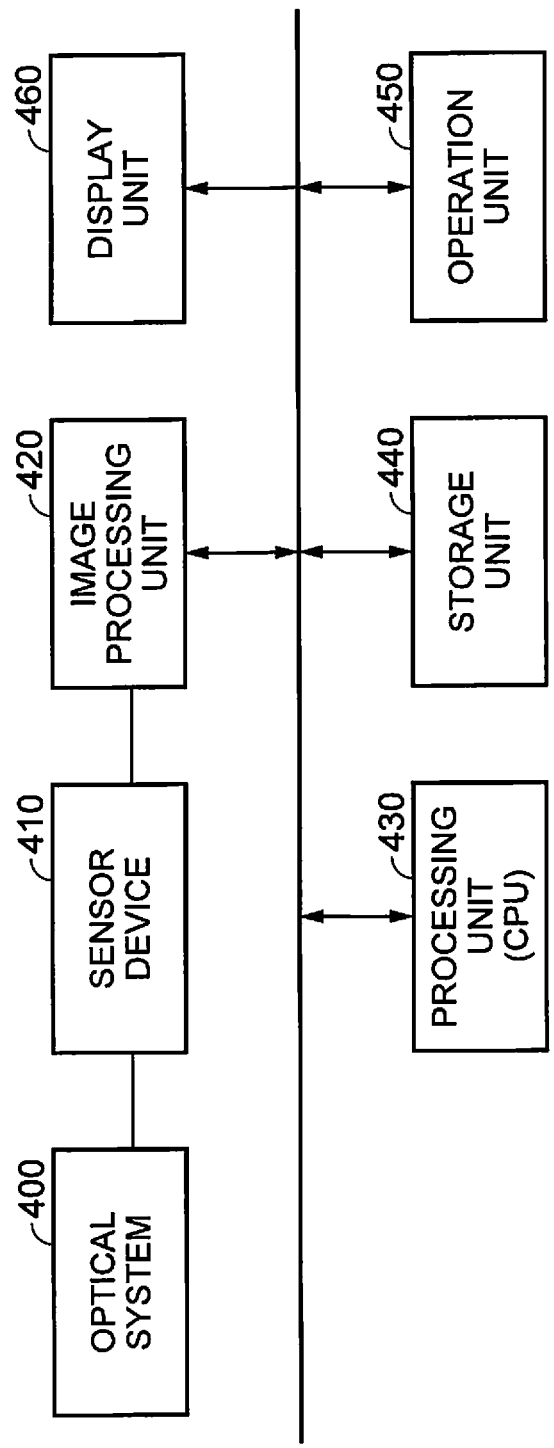
FIG. 16 is a diagram showing an example configuration of an electronic apparatus including a thermoelectric conversion element according to this embodiment.

FIG. 16 shows an example configuration of an electronic apparatus including the thermoelectric conversion element of this embodiment. The electronic apparatus includes an optical system 400, a sensor device 410, an image processing unit 420, a processing unit 430, a storage unit 440, an operation unit 450, and a display unit 460. Note that the electronic apparatus of this embodiment is not limited to the configuration of FIG. 16, and may be in various other different forms. For example, a portion of the components (e.g., the optical system, operation unit, display unit, etc.) may be removed, or other components may be added.

The optical system 400 includes, for example, one or more lenses, a drive unit which drives these lenses, and the like. The optical system 400 forms an image of an object on the sensor device 410, for example. The optical system 400 also adjusts the focus when necessary, for example.

The sensor device 410 includes a two-dimensional array of the thermoelectric conversion elements 110 of this embodiment, a plurality of row lines (scan lines), and a plurality of column lines (data lines). In addition to the two-dimensional array of the thermoelectric conversion elements 110, i.e., the light detection device 100, the sensor device 410 may include a row selection circuit (row driver), a read circuit which reads data from a thermoelectric conversion element 110 through a column line, an A/D conversion unit, and the like. By successively reading data from the two-dimensional array of the thermoelectric conversion elements 110, an image of an object can be captured.

The image processing unit 420 performs various image processes, such as an image correction process and the like, based on digital image data (pixel data) from the sensor device 410.

The processing unit 430 controls the entire electronic apparatus and each block in the electronic apparatus. The processing unit 430 may, for example, be a CPU or the like. The storage unit 440 stores various kinds of information, and functions as a work area for the processing unit 430 or the image processing unit 420, for example. The operation unit 450 may be an interface for allowing a user to operate the electronic apparatus, and may, for example, be various buttons, a graphical user interface (GUI) screen, or the like. The display unit 460 displays, for example, an image obtained by the sensor device 410, a GUI screen, and the like, and may be various displays, such as a liquid crystal display, organic EL display, and the like.

Thus, a single thermoelectric conversion element 110 (one cell) may be used as a sensor, and in addition, cells each including the thermoelectric conversion element 110 are arranged in a two-dimensional array along two axial directions, e.g., two orthogonal axial directions, whereby the sensor device 410 may be configured. The sensor device 410 can receive light and provides a heat distribution image or thermogram caused by the light (electromagnetic waves). The sensor device 410 may be used to configure an electronic apparatus which employs an image capture device, such as an apparatus for detecting a particular substance, an apparatus for detecting a counterfeit bill, an apparatus for detecting a drug in an envelope, an apparatus for performing nondestructive testing on building structures, or the like.

Figure 17A:
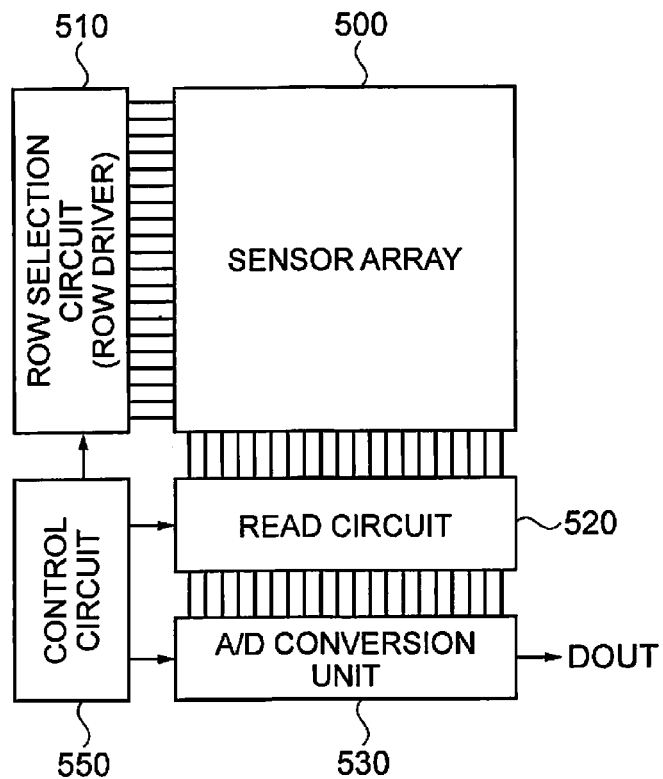
FIG. 17A is a block diagram showing an example configuration of a sensor device of FIG. 16.

FIG. 17A shows an example configuration of the sensor device 410 of FIG. 16. The sensor device 410 includes a sensor array 500, a row selection circuit (row driver) 510, and a read circuit 520. The sensor device 410 may also include an A/D conversion unit 530 and a control circuit 550. The sensor device can be used to provide a high-performance image capture apparatus.

The sensor array 500 includes a plurality of sensor cells arranged (in an array) along two axial directions. Also, a plurality of row lines (scan lines) and a plurality of column lines (data lines) are provided. Note that either the number of row lines or the number of column lines may be one. For example, if the number of row lines is one, a plurality of sensor cells are arranged in a direction along the row line (horizontal direction) in FIG. 17A. On the other hand, if the number of column lines is one, a plurality of sensor cells are arranged in a direction along the column line (vertical direction).

Figure 17B:
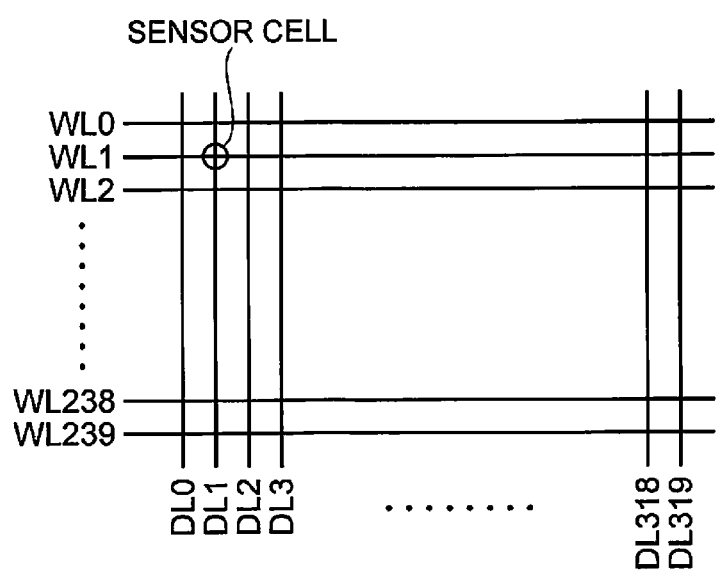
FIG. 17B is a diagram showing an example configuration of a sensor array in the sensor device.

As shown in FIG. 17B, each sensor cell of the sensor array 500 is located (formed) at a position corresponding to an intersection between the corresponding row line and column line. For example, a sensor cell is located at an intersection between a row line WL1 and a column line DL1. The same is true for the other sensor cells.

The row selection circuit 510 is connected to one or more row lines. The row selection circuit 510 performs a selection operation on each row line. For example, when the sensor array 500 (focal plane array) is a QVGA (320×240 pixels) as shown in FIG. 17B, the sensor array 500 successively selects (scans) the row lines WL0, WL1, WL2, . . . , and WL239.

Specifically, the row selection circuit 510 outputs a signal for selecting these row lines (word select signal) to the sensor array 500.

The read circuit 520 is connected to one or more column lines. The read circuit 520 performs a read operation on each column line. When the sensor array 500 is, for example, a QVGA, the sensor array 500 reads a detection signal (detected current, detected electric charge) from the column lines DL0, DL1, DL2, . . . , and DL319.

The A/D conversion unit 530 performs an A/D conversion process of converting a detected voltage (measured voltage, attained voltage) obtained by the read circuit 520 into digital data. Thereafter, the A/D conversion unit 530 outputs the digital data DOUT after A/D conversion. Specifically, the A/D conversion unit 530 includes A/D converters corresponding to the respective column lines. Each A/D converter performs an A/D conversion process on a detected voltage obtained by the read circuit 520 for the corresponding column line. Note that one A/D converter may be provided, corresponding to a plurality of column lines, and this single A/D converter may be used to perform A/D conversion on detected voltages of the plurality of column lines in a time-division fashion.

The control circuit 550 (timing generation circuit) generates and outputs various control signals to the row selection circuit 510, the read circuit 520, and the A/D conversion unit 530. For example, the control circuit 550 generates and outputs control signals for charging and discharging (resetting). Alternatively, the control circuit 550 generates and outputs a signal for controlling the timing of each circuit.

Figure 18:
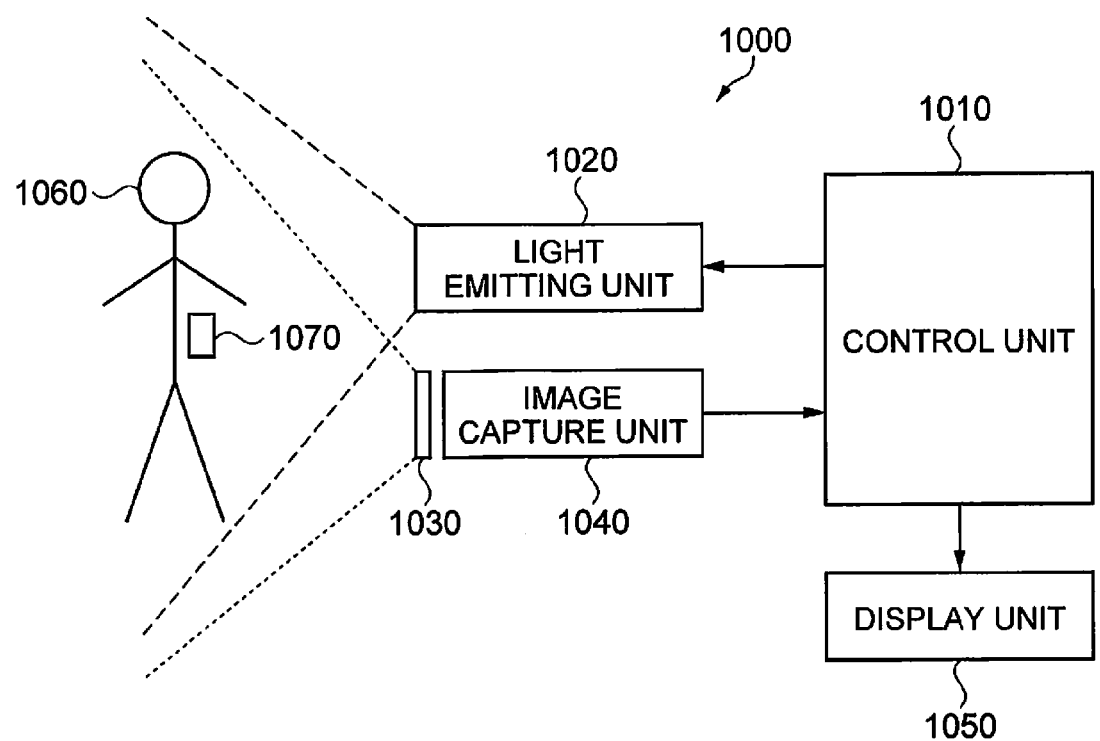
FIG. 18 is a diagram showing an example terahertz camera including a thermoelectric conversion element according to this embodiment.

FIG. 18 shows an example terahertz camera including the thermoelectric conversion element 110 of this embodiment. The sensor device 410 is set to have an absorption wavelength which is optimized for terahertz waves. A terahertz camera 1000 which includes a combination of the sensor device 410 and a terahertz light emitting unit is shown.

The terahertz camera 1000 includes a control unit 1010, a light emitting unit 1020, an optical filter 1030, an image capture unit 1040, and a display unit 1050. The image capture unit 1040 includes an optical system such as a lens or the like (not shown) and the sensor device 410 in which the absorption wavelength of the aforementioned thermoelectric conversion element 110 is optimized for a terahertz range (1-3 THz).

The control unit 1010 includes a system controller which controls the entire apparatus. The system controller controls a light source drive unit and an image processing unit which are included in the control unit 1010. The light emitting unit 1020 includes a laser device which emits terahertz light (electromagnetic waves having a wavelength within the range of 100-1000 µm) and an optical system, and emits the terahertz light to a human 1060 to be tested. The terahertz light reflected from the human 1060 is received by the image capture unit 1040 through the optical filter 1030 which passes only the spectrum of a particular substance 1070 to be detected. The image processing unit of the control unit 1010 performs a predetermined image process on an image signal generated by the image capture unit 1040, and outputs the resultant image signal to the display unit 1050. Because the strength of the received signal varies depending on whether or not the particular substance 1070 exists in clothes worn by the human 1060 or the like, the presence or absence of the particular substance 1070 can be determined.

Note that the absorption wavelength may be optimized to fall within the terahertz range by, for example, incorporating an optical filter which passes only light of the terahertz range into the sensor device 410.

The invention is not limited to the above embodiments. Various changes and modifications can be made without departing the scope and spirit of the invention as set forth in the claims and specification. The thermoelectric conversion element and light detection device thus changed or modified, and an electronic apparatus including such a thermoelectric conversion element, are included within the scope of the invention. Many variations may be conceived in addition to the above embodiments. Some variations will now be described below.

Variation 1

In the thermoelectric conversion element 110, the number of the pyroelectric capacitors 115 provided on the support member 111 is not limited to one, and may be two or more. The pyroelectric capacitors 115 may be electrically connected together in series or in parallel, or in series-parallel combinations, on the support member 111.

Variation 2

In the thermoelectric conversion element 110, the shape of the pyroelectric capacitor 115 as viewed from above is not limited to a quadrangle. For example, the shape of the pyroelectric capacitor 115 as viewed from above may be a polygon, circle, ellipse, or other shapes in addition to a quadrangle.

The entire disclosure of Japanese Patent Application No. 2014-75183, filed Apr. 1, 2014, is expressly incorporated by reference herein.

What is claimed is:

1. A thermoelectric conversion element comprising:
a pair of electrodes; and
a ferroelectric layer sandwiched between the pair of electrodes,
wherein
the ferroelectric layer includes at least Bi (bismuth), La (lanthanum), and Fe (iron), and
a molar fraction of La in a Bi/La site in the crystal structure of the ferroelectric layer is 0.15 or more and 0.20 or less.

2. The thermoelectric conversion element according to claim 1, wherein
the ferroelectric layer further includes Mn (manganese) and Ti (titanium), and
a molar fraction of Ti in a Fe/Mn/Ti site in the crystal structure of the ferroelectric layer is 0.05 or less.

3. The thermoelectric conversion element according to claim 1, wherein
the thermoelectric conversion element has a degree of polarization retained in the thermoelectric conversion element changes reversibly with respect to a change in element temperature.

4. The thermoelectric conversion element according to claim 1, wherein
the thermoelectric conversion element has a pyroelectric coefficient of less than $-4$ [$nC/(cm^2 \cdot K)$] during the time when element temperature increases.

5. The thermoelectric conversion element according to claim 1, wherein
the thermoelectric conversion element has a polarization retention rate of 87% or more in 7 min after a polarization process.

6. The thermoelectric conversion element according to claim 1, wherein
the thermoelectric conversion element has a polarization retention rate of 84% or more in 15 h after a polarization process.

7. The thermoelectric conversion element according to claim 1, further comprising:
a light absorptive portion which is in contact with one of the pair of electrodes.

8. A light detection device comprising:
the thermoelectric conversion elements according to claim 7 arranged in a two-dimensional array along two orthogonal axial directions.

9. An electronic apparatus comprising:
the thermoelectric conversion element according to claim 7.

10. An electronic apparatus comprising:
the light detection device according to claim 8.

* * * * *